(No Model.)

A. W. ELDREDGE.
DOMESTIC STEAM COOKING APPARATUS.

No. 458,417.  Patented Aug. 25, 1891.

Witnesses
Robt Pruitt
Dennis Sumby

Inventor:
Alonzo W. Eldredge
By
Edward Taygart
Atty.

UNITED STATES PATENT OFFICE.

ALONZO W. ELDREDGE, OF BIG RAPIDS, MICHIGAN.

DOMESTIC STEAM COOKING APPARATUS.

SPECIFICATION forming part of Letters Patent No. 458,417, dated August 25, 1891.

Application filed October 25, 1890. Serial No. 369,336. (No model.)

*To all whom it may concern:*

Be it known that I, ALONZO W. ELDREDGE, a citizen of the United States, residing at the city of Big Rapids, in the county of Mecosta and State of Michigan, have invented a certain new and useful Domestic Steam Cooking Apparatus, of which the following is a specification.

My invention relates to a new and improved steam cooking apparatus used for domestic purposes; and it consists in the combination, with a vessel, of a water-tank having connection with a thin sheet of water between the bottom and false bottom of the vessel.

It also consists in the arrangement of a water-tank on the outer side of the vessel proper having connection with a water-space below the vessel proper, and also a connection for the passage of steam from the outer water-tank into the vessel.

It also consists in the combination, with a water-tank without the vessel and the water-space below the vessel proper, of a whistle or signal; also, in other features of construction and arrangement hereinafter described.

The object of my invention is to produce a steam cooking apparatus which can be quickly and readily heated, thereby economizing both time and fuel; also, to produce an apparatus adapted to cook at the same time various articles of food; also, other objects hereinafter more fully described. These objects I accomplish by means of the mechanism illustrated in the accompanying drawings, in which—

Figure 1:
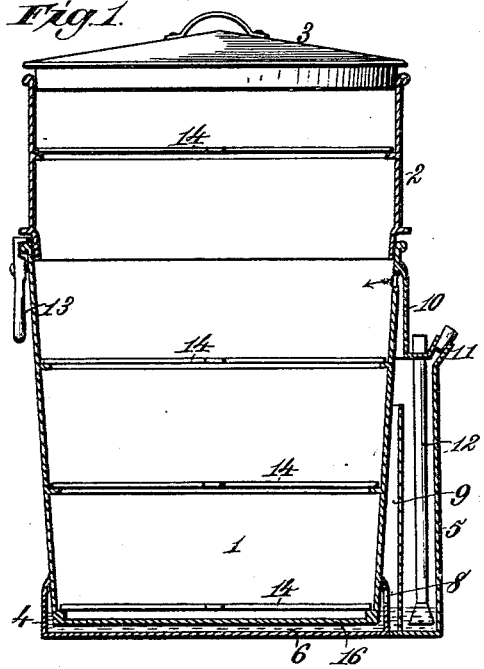
Figure 2:
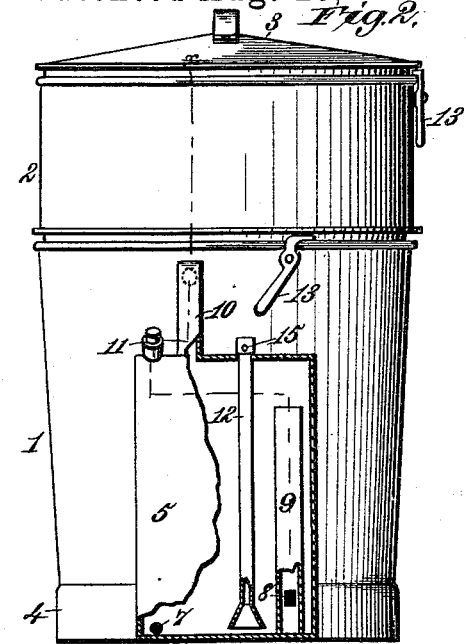
Figure 3:
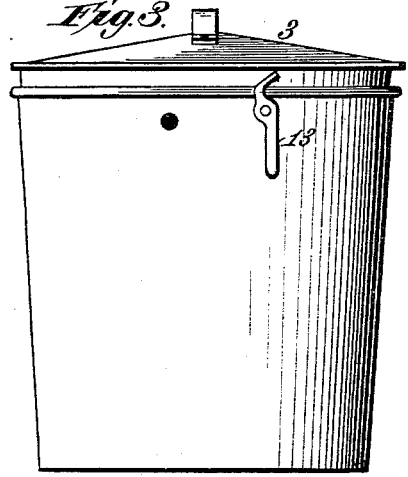
Figure 4:
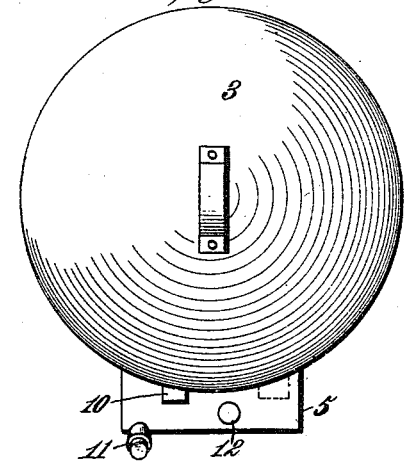
Figure 5:
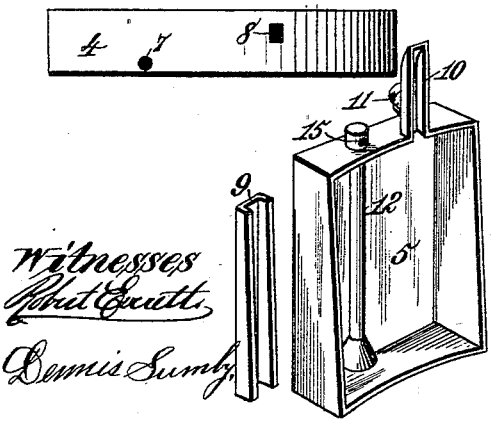
Figure 5:
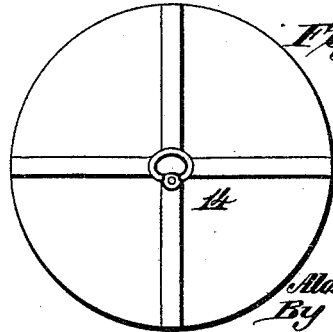

Figure 1 is a vertical sectional view of my improved cooking apparatus on line $x\ x$ of Fig. 2. Fig. 2 is a side elevation with a portion of the outer wall of the water-tank removed in order to show more clearly the steam and water passages from the water-tank to the other parts of the apparatus. Fig. 3 shows various parts of the apparatus detached in order to show in detail more clearly the construction of the several parts. Fig. 4 is a plan view of the complete apparatus, and Fig. 5 is a plan view of one of the partition trays.

Similar figures refer to similar parts throughout the several views.

1 represents the body of the vessel or apparatus, which is made of metal and may be shaped something like an ordinary pail.

2 represents a detachable extensible cylinder in form, which is used in connection with the body 1 when a large space is required for cooking. When the extensible cylinder 2 is removed, the cover 3 rests directly upon the body 1, but when the cylinder 2 is used the cover 3 is placed on the top thereof, as shown in Fig. 2. The cover or lid 3 is constructed in any suitable form and should be made of sufficient size to fit closely and retain to a certain extent the steam within the body of the vessel.

At the bottom of the vessel 1 is a cylindrical part 4, which may be constructed of copper, brass or any suitable material or may be made integral with the body 1.

6 is a water-space between the bottom of the vessel and the false bottom 16. This space is preferably very shallow—say about one-sixteenth of an inch—although its dimensions may be varied.

5 represents the water-tank provided with an opening 7, extending into the water-space 6, and also provided with an opening 8 for the escape of steam generated within the space 6 into the tube 9, from which tube the steam passes into the inner side of the water-tank 5 and from thence through the pipe or tube 10 into the body of the vessel. The opening into the vessel is shown by the arrow in Fig. 1.

11 is an opening in the water-tank 5 used in filling the tank with water. This opening 11 is provided with a suitable plug.

12 is a tube placed within the water-tank and extending to a point a short distance above the bottom thereof and is preferably funnel-shaped at the bottom. The tube extends upwardly and is provided with a whistle and opening 15. The object of this tube and whistle is to sound the alarm whenever the water in the tank 5 is below the lower part of the tube. The steam passes into the tube and out through the opening 15, sounding the alarm.

13 13 are pivoted levers, preferably eccentric in shape, one used for the purpose of loosening the cover and one used for the purpose of loosening the upper section.

In using a steam cooking apparatus it is desirable to have the parts fit together as closely as possible. Sometimes they will bind, rendering it difficult to remove the section or the cover. By means of the levers 13 13 this difficulty is entirely obviated. These levers may be placed on two sides of the apparatus, so that the cover may be loosened at both sides, and also that the movable section may be loosened at both sides at the same time.

14 14, &c., are trays for supporting the articles of food to be cooked within the steaming apparatus.

16 is the inside bottom of the vessel above referred to.

In Fig. 3 I have shown the bottom pieces 4 detached in order to show more fully its peculiar construction. I have also shown the tubes 9 and 10, the levers 13 13, the tube 12, the body 1, the cover 3, and the water-reservoir 5 in detached positions.

In using my invention the tank 5 is filled or partially filled with water, the water passing through the opening 7 into the water-space 6. The opening 11 is then closed by means of the plug, and the food is placed within upon the trays, or, if required, without the trays. The apparatus is then placed upon the stove. The thin sheet of water is quickly heated, and the steam passes into the reservoir 5 and from thence into the internal parts of the apparatus, completely filling the same, and inasmuch as the vessel is made tight the steam will permeate the entire internal portions, acting upon whatever may be placed therein to be cooked, and will escape very slowly therefrom. The heat being intense, the steam throughout the entire apparatus is made at a very high temperature, thereby very quickly and effectually acting upon the food placed within the receptacle.

Having thus described my invention, what I claim to have invented, and desire to secure by Letters Patent, is—

1. In a domestic steam cooking apparatus, the combination of a cooking-vessel having a thin sheet of water at the bottom, a water-tank connected with said thin sheet of water for gradually feeding water and maintaining the thin sheet of water as steam is formed, and a tubular connection communicating with the interior of the cooking-vessel and conducting thereinto the steam produced from the thin sheet of water, substantially as described.

2. In a domestic steam cooking apparatus, the combination of a cooking-vessel provided with a thin sheet of water at the bottom and a water-tank having an opening into said thin sheet of water for the purpose of gradually feeding water and maintaining the thin sheet of water as steam is formed, a steam-opening from said internal sheet of water to said reservoir, and an opening for the escape of steam from said water-tank into the interior of the cooking vessel or receptacle, substantially as described.

3. In a domestic steam cooking apparatus, the combination of a cooking-vessel provided with a thin sheet of water, as 6, a water-reservoir placed without the walls of said cooking-vessel, having an opening from the said sheet of water to said water-reservoir, and a steam-opening from said water-tank into the interior of the cooking-vessel, substantially as and for the purpose described.

4. The combination of a cooking-vessel, as 1, provided with a thin sheet of water, as 6, and an external water-tank, as 5, said water-tank provided with a water-opening, as 7, for gradually feeding water and maintaining the thin sheet of water, a steam-opening whereby the steam is conveyed from the water-tank to the body, as 10, and suitable means for supplying water to the water-tank, substantially as described.

5. In a domestic steam cooking apparatus, the combination of a water-tank, as 5, a body, as 1, said water-tank having water and steam connections with the sheet of water, as 6, for the gradual flow of water thereto and the escape of steam therefrom into the water-tank, a steam connection, as 10, between the water-tank and the interior of the body 1, and a low-water indicator, as 12, all constructed substantially as and for the purpose described.

In witness whereof I have hereunto set my hand and seal in the presence of two witnesses.

ALONZO W. ELDREDGE. [L. S.]

Witnesses:
EDWARD TAGGART,
HARRY P. VAN WAGNER.